May 23, 1939.  J. M. NICKELSEN  2,159,289

VALVE CONSTRUCTION

Filed March 15, 1937

INVENTOR
JOHN M. NICKELSEN.

BY W. Kittemore Hulbert & Belknap

ATTORNEYS

Patented May 23, 1939

2,159,289

UNITED STATES PATENT OFFICE 2,159,289

VALVE CONSTRUCTION

John M. Nickelsen, Ann Arbor, Mich., assignor to Monroe Auto Equipment Company, Monroe, Mich., a corporation of Michigan Application March 15, 1937, Serial No. 131,065

1 Claim. (Cl. 277—61)

This invention relates generally to valve constructions and refers more particularly to fluid pressure relief valves.

One of the principal objects of this invention consists in the provision of a relatively simple inexpensive pressure relief valve which is not only capable of operating at a high frequency but, in addition, is accurate in operation and may be used in all cases where it is advantageous to maintain accurate predetermined pressures.

Another advantageous feature of this invention resides in the provision of a relief valve construction embodying a resilient element having the outer edge engaging a seat surrounding the fluid passage through the valve body and having a portion at one side of the passage secured to the valve body under a pressure determined in accordance with the pressure it is desired to open communication through the passage.

Still another object of this invention consists in the provision of a pressure relief valve embodying a resilient disc having the peripheral edge portion thereof engaging an annular seat surrounding a fluid passage through the valve body and having a central portion secured to the latter in a manner to cause a predetermined pressure of engagement of the periphery of the disc with the annular seat.

A further feature of the present invention resides in the provision of a valve construction of the character previously set forth having means providing relatively free return flow of fluid past the resilient valve disc.

In addition to the above, the present invention contemplates a pressure relief valve assembly having a bleed opening of selected capacity providing limited escape of fluid under pressure around the resilient disc from the high pressure side of the valve. This feature, as well as the foregoing and other objects, will be made more apparent as this description proceeds, especially when considered in connection with the accompanying drawing, wherein.

Figure 1:
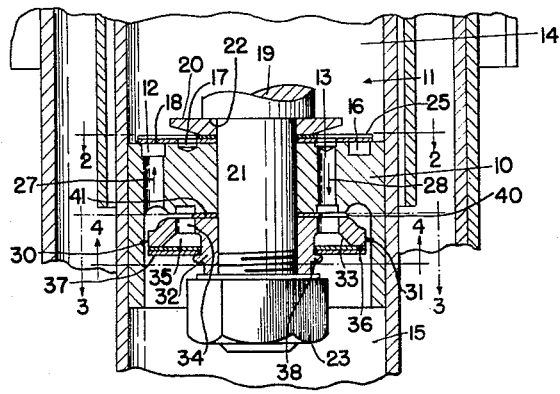
Figure 1 is a sectional view through a valve assembly constructed in accordance with this invention.

Referring first to the embodiment of the invention illustrated in Figures 1 to 4, inclusive, it will be noted that this embodiment discloses a valve assembly embodying valve means for controlling the flow of fluid in one direction through a fluid passage 11 and embodying additional valve means for controlling the flow of fluid through the passage in the opposite direction. It will also be noted as this description proceeds, that the specific valve assembly selected for the purpose of illustration restricts the flow of fluid through the passage in both of the aforesaid directions, but is constructed to restrict the flow of fluid in one direction to a greater extent than the flow in the opposite direction.

Referring now more in detail to the valve assembly shown in Figures 1 to 4, inclusive, it will be noted that the same comprises a valve body 10 fixed, or slidably mounted, in a fluid passage 11, depending upon the particular use of the valve assembly to be more fully hereinafter referred to. In either case, the valve body 10 is formed with two series of ports therethrough, designated in the drawing by the reference characters 12 and 13. The two series of ports are spaced from each other radially of the valve body 10 and both series establish communication through the valve body between the portions 14 and 15 of the fluid passage 11 on opposite sides of the valve assembly.

Figure 2:
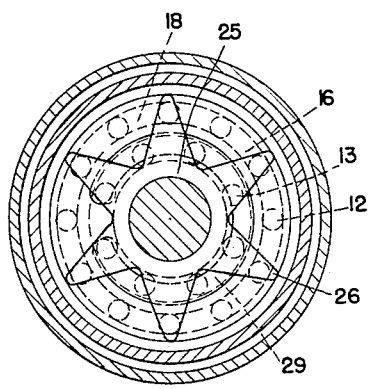
Figure 2 is a cross sectional view taken substantially on the plane indicated by the line 2—2 of Figure 1.
Figure 4:
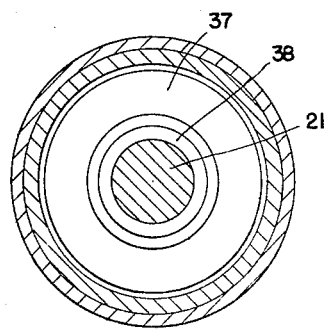
Figure 4 is a cross sectional view taken substantially on the plane indicated by the line 4—4 of Figure 1.
Figure 3:
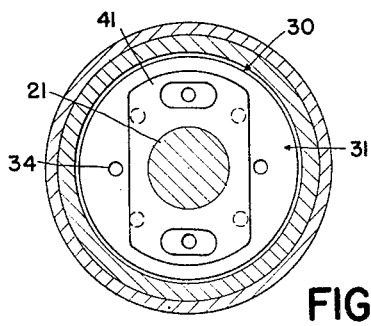
Figure 3 is a cross sectional view taken substantially on the plane indicated by the line 3—3 of Figure 1.

Upon reference to Figure 2, it will be noted that the outer series of ports 12 are spaced equal distances from the axis of the valve body 10 and communicate with each other at one end through the medium of an annular groove 16 formed in the corresponding end of the valve body 10. The inner series of ports 13 are also spaced from each other equal distances from the axis of the valve body 10 and annular grooves 17 are formed in opposite ends of the valve body 10 to establish communication between the inner series of ports 13.

In the present instance, fluid is prevented from flowing from the side 14 of the passage 11 into the series of ports 12 by means of a resilient disc 18 seated upon the grooved end of the valve body 10 and having the peripheral portion extending over the groove 16. The central portion of the disc 18 is fixedly secured to the valve body 10 by means of a stud 19 and a washer 20. In detail, the stud 19 is provided with a reduced shank portion 21 extending through aligned openings in the center of the resilient disc 18 and valve body 10. The reduced portion 21 of the stud forms a shoulder 22 engageable with the washer and cooperating with a nut 23 on the threaded end of the reduced portion to clamp the washer 20 and valve body 10 together with the central portion of the resilient disc 18 therebetween.

As shown in Figure 1, the surface of the washer 20 adjacent the valve body 10 is chamfered at the periphery of the washer to permit sufficient flexing of the peripheral portion of the resilient disc 18 away from the valve body to open communication through the ports 12. In some instances, it may be desirable to insure and expedite closing of the resilient disc valve member 18. This is accomplished in the present instance by a resilient member 25 clamped between the washer 20 and the resilient valve disc 18 and having circumferentially spaced fingers 26 engageable with the valve disc at the periphery thereof.

From the foregoing, it will be apparent that the resilient valve disc 18 prevents the flow of fluid through the ports 12 in the direction of the arrow 27 until sufficient pressure is accumulated in the annular groove 16 to flex the peripheral portion of the valve disc 18 in a direction away from the valve body 10. In other words, the valve disc 18 provides pressure actuated means for controlling the flow of fluid through the series of ports 12 in the direction of the arrow 27. However, the valve disc 18 does not interfere with the passage of fluid through the inner series of ports 13 in the direction of the arrow 28, as evidenced by the fact that the valve disc 18 is formed with a slot 29 therethrough registering with the series of ports 13. In some cases, it may be advantageous to control the flow of fluid through the ports 13 in the direction of the arrow 28 and, in the present instance, the passage of fluid in this direction through the ports 13 is resisted to a greater extent than the opposite flow of fluid through the ports 12. This is accomplished by a check valve unit 30 having a body 31 secured to the valve body 10 by means of the clamping nut 23. Upon reference to Figure 1, it will be noted that the valve body 31 is provided with an axially extending hub portion 32 for receiving the reduced portion 21 of the stud and is formed with a radially outwardly extending flange 33 adjacent the valve body. The flange 33 is formed with a series of openings 34 therethrough registering with the groove 17 in the bottom of the valve body, and the periphery of the flange 33 is offset axially in a direction away from the valve body to form an annular recess 35 surrounded by an annular valve seat 36. The recess 35 communicates with the series of openings 34 through the radial flange 33 of the valve body 31, and this recess is normally closed at the outer side by means of a resilient valve disc 37 having a plurality of superposed laminations centrally apertured to receive the hub 32 of the valve body 31. The hub 32 is upset in the manner indicated by the reference character 38 in Figure 1 to secure the resilient valve disc 37 with the peripheral portion of this disc tensioned against the annular valve seat 36. In other words, the valve body 31 and the resilient disc valve 37 are assembled under pressure and by assembling these elements under a predetermined pressure, the pressure at which the peripheral portion of the disc 37 flexes away from the valve seat 36 to permit the escape of fluid through the ports 13 in the direction of the arrow 28, may be accurately regulated.

It will be noted from the above that the check valve unit 30 of the valve assembly is so constructed that it will not interfere with the passage of fluid through the ports 12 in the direction of the arrow 27 and will only permit the return flow of fluid through the ports 13 in the opposite direction when the pressure of this fluid exceeds the predetermined pressure of engagement of the periphery of the valve disc 37 with the annular valve seat 36. In other words, the valve assembly embodies pressure actuated means for controlling the flow of fluid in opposite directions through the valve body from one side of the fluid passage to the other. It will also be noted that with the above type of valve assembly, the flow of fluid in one direction may be restricted to a greater extent than the flow of fluid in the opposite direction. This mode of operation may be advantageously used in controlling numerous different types of fluid pressure systems and perhaps one of the most common applications is in direct acting fluid type shock absorbers of the character set forth in the Becker et al. Patent No. 2,078,364, issued April 27, 1937, filed October 14, 1935. When used for the purpose disclosed in the above identified copending application, the valve assembly is preferably slidably mounted in the fluid passage 11 so as to permit relatively free movement of the shock parts in one direction and to resist movement of the parts to a greater extent in the opposite direction. It is to be understood, however, that the use of my improved valve assembly in connection with a shock absorber is merely one example of the utility of the valve assembly and the latter is by no means limited to this specific use. Attention is also called to the fact that the principle of the pressure relief valve unit 30 may be used separately from the valve assembly in all cases where it is desired to maintain an accurate predetermined pressure in a fluid supply line.

In certain installations of the valve assembly, such as the specific use referred to above, it may be desired to control or vary the restriction of flow of fluid through the ports 13 in the direction of the arrow 28, and this is accomplished herein by providing a bleed opening 40 of selected capacity around the check valve for by-passing fluid past the latter. In the present instance, the bleed or by-pass is effected by interposing a washer 41 of predetermined thickness between the two valve bodies 10 and 31. As shown particularly in Figure 1, the washer 40 provides a clearance between the discharge ends of the ports 13 in the valve body 10 and the openings 34 in the valve body 31, so that a certain quantity of the fluid flowing through the ports 13 in the direction of the arrow 28 may escape into the portion 15 of the passage 11 around the check valve unit 30. It will be apparent that the quantity of fluid medium by-passed will depend upon the amount of clearance and the latter, in turn, depends upon the thickness of the washer 41. Thus, by interposing washers of different thicknesses between the two valve bodies, the quantity of fluid medium by-passed may be varied and, as a consequence, the pressure characteristics of the valve assembly changed to conform to the requirements.

Figure 5:
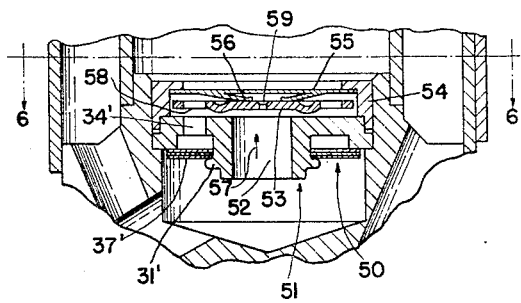
Figure 5 is a central sectional view through a modified form of valve construction.
Figure 6:
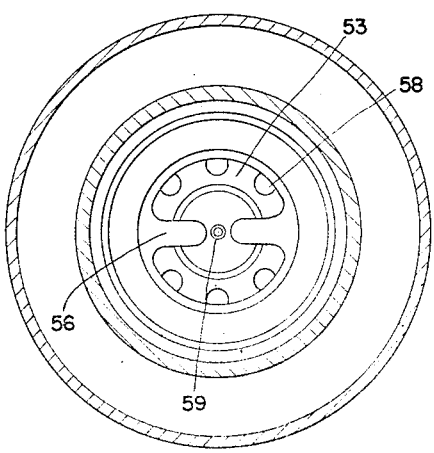
Figure 6 is a cross sectional view taken substantially on the plane indicated by the line 6—6 of Figure 5.

Referring now to the embodiment of the invention illustrated in Figures 5 and 6, it will be noted that the valve assembly 50 comprises a check valve unit 51 identical in construction to the check valve unit 30 previously described, with the exception that the valve body 31' is provided with a fluid passage 52 through the center thereof. This passage permits the return flow of fluid through the valve body and is controlled by a flapper valve 53 housed in a retainer 54 and normally urged to its closed position by means of a spring 55. The spring 55 is in the form of a ring secured in the retainer 54 and having opposed inwardly extending fingers 56 engageable with the flapper valve disc 53 to normally hold the latter in its closed position against the valve body 31'. The spring pressure exerted on the flapper valve 53 is merely sufficient to quickly return the valve to its seat and offers the minimum resistance to the flow of fluid through the passage 52 in the direction of the arrow 57. The construction is such that the flapper valve disc 53 controls the flow of fluid through the passage 52 in the direction of the arrow 57, and the check valve disc 37' controls the flow of fluid in the opposite direction through the openings 34' in the valve body. In this connection, it is to be noted that the peripheral portions of the flapper valve disc are apertured, as at 58, so as not to interfere with the flow of fluid through the openings 34'. In this construction, fluid may be by-passed around the check valve disc 37' by a restricted bleed opening 59 in the central portion of the flapper valve 53, and this bleed opening may be varied to provide the operation desired for the particular installation.

The valve assembly 50 may be used in conjunction with the valve assembly previously described or may be used separately therefrom. In the specific installation mentioned above and shown in the Becker et al. Patent No. 2,078,364 issued April 27, 1937, the two valve assemblies may be used in cooperation with each other to advantage, but it should be understood that these valve assemblies are not limited to this specific use.

What I claim as my invention is:

In a valve assembly, a body member having passages therethrough for fluid, means for controlling the flow of fluid through one of the passages in one direction including a resilient disc having the peripheral portion overlying said passage and capable of flexing movement in a direction away from the body member, means securing the central portion of the disc to the body member under a predetermined pressure, a second valve body member adjacent the member aforesaid and having a port therethrough registering with another of the ports in the first mentioned member, means controlling the flow of fluid through the registering ports in the opposite direction including a resilient disc having the peripheral portion overlying the registering ports and capable of flexing movement in a direction away from the body members, means securing the second named resilient disc to the second mentioned body member under a predetermined pressure, and a spacer disposed between the two body members providing a permanent bleed opening around the second mentioned resilient disc.

JOHN M. NICKELSEN.